United States Patent
Jollota

(12) 
(10) Patent No.: US 6,341,159 B1
(45) Date of Patent: Jan. 22, 2002

(54) EXTRAPOLATION OF LOCATION AND AMPLITUDE OF NOISE SOURCES ON TELECOMMUNICATION WIRELINE FROM ENDED ACCESS POINT

(75) Inventor: James M. Jollota, Simi Valley, CA (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/507,074

(22) Filed: Feb. 18, 2000

(51) Int. Cl.[7] .......................... H04M 1/24; G01R 31/08
(52) U.S. Cl. .................. 379/22.03; 379/1.01; 379/1.04; 379/14.01; 379/15.05; 379/22.08; 379/24; 324/519
(58) Field of Search ............................. 379/1, 5, 6, 13, 379/14, 22, 24, 26, 27, 29, 30, 32; 324/602, 609, 611, 532, 533, 534, 500, 512, 519, 527, 528, 529, 530, 541, 542; 370/241, 242, 348.252

(56) References Cited

U.S. PATENT DOCUMENTS 5,128,619 A * 7/1992 Bjork et al. ............... 324/533
5,644,617 A * 7/1997 Schmidt ..................... 379/5
5,864,602 A * 1/1999 Needle ....................... 379/6
5,995,588 A * 11/1999 Crick ........................ 379/22
6,084,946 A * 7/2000 Beierle ...................... 379/30

* cited by examiner

Primary Examiner—Binh Tieu
(74) Attorney, Agent, or Firm—Allen, Dyer, Doppelt, Milbrath & Gilchrist, P.A.

(57) ABSTRACT

A wide band noise extrapolation test system, which may reside within a processor-controlled test head installed in a central office, or as part of test signal generation and processing circuitry of a craftsperson's test set, processes data derived from applying single ended stimuli to a plurality of wirelines. The processing mechanism accurately and reliably identifies the locations and amplitudes of remote noise sources for each of the wirelines, by determining attenuation along and the lengths of the wirelines, and then modifying values of noise measurements in accordance with the determined attenuation and length values, so as to extrapolate the amplitudes of the noise at their identified source locations.

15 Claims, 2 Drawing Sheets

EXTRAPOLATION OF LOCATION AND AMPLITUDE OF NOISE SOURCES ON TELECOMMUNICATION WIRELINE FROM ENDED ACCESS POINT

FIELD OF THE INVENTION

The present invention is directed to communication systems, and is particularly directed to a test unit resident mechanism for automatically deriving, from a single ended wireline access point, the location and amplitude of a source of noise that may impair digital communications along a wireline telecommunication link.

BACKGROUND OF THE INVENTION

In the face of the increasing demand for a variety of digital communication services (such as, but not limited to internet services), telecommunication service providers are continually seeking ways to optimize the bandwidth and digital signal transport distance of their very substantial existing copper plant, that was originally installed to carry nothing more than conventional analog (plain old telephone service or POTS) signals. In addition to the inherent bandwidth limitations of the (twisted pair) copper wire medium, service providers must deal with the fact that in-place metallic cable plants are subject to a variety of influences, such as RF signals emitted by a local radio station, and cross-talk from one or more adjacent twisted pairs, that can introduce data-impairing noise into a data transporting wireline path.

Although currently available (remote) test units allow telco service personnel to conduct a number of different electrical measurements on a line under test (LUT), such as but not limited to variable tone measurements (e.g., over a sweep frequency of up to 1.5 MHz), bridge tap detection, capacitance measurements, and the like, these units are essentially single ended devices—being connectable to only a single point of access of the wireline link, typically at or in the immediate vicinity of a central office's main distribution frame.

This single ended connectivity limitation has conventionally constituted a major impediment to identifying and locating noise sources in an existing copper plant, such as one that needs to be evaluated for digital data transport capability. In a standard (single ended) test unit, the noise source cannot be accurately identified, since the test head cannot distinguish between a relatively weak noise signal introduced very close to the point of access, head, or a very large amplitude source injected much farther (for example thousands of feet) away (for example at a customer premises site), and attenuated by associated cable loss characteristics.

SUMMARY OF THE INVENTION

This inability of conventional single ended measurement schemes to accurately and reliably identify the location and amplitude of a noise source along a wireline telecommunication link is effectively obviated by means of a wide band noise extrapolation mechanism of the present invention, which may be readily implemented in a processor-controlled test head installed in a central office, or as part of test signal generation and processing circuitry of a portable craftsperson's test set.

Pursuant to the invention, the test head contains test signal generation and processing circuitry, that is operative to process a prescribed set of wireline measurement data, including noise and cable plant parameter measurements conducted from a single access point, to reliably identify both the location and the amplitude of a noise source along any of a plurality of wireline cable plants that extend from an access point to various drop sites, where the cable plant is most susceptible to noise ingress. As will be described, the invention employs a measurement analysis mechanism that combines the ability to make accurate electrical measurements from a single access point with the inherent characteristics of the cable plant, to extrapolate both the distance of the noise source from the test point, as well as the actual amplitude of the noise as injected or induced at the remote source.

In the non-limiting example to be detailed below, the invention resides in a processor-controlled test head, that is selectively connectable to respective cross connect points of an interconnect matrix switch, such as, but not limited to a CTAS interconnect matrix switch, employed by a central office to connect high data rate digital data traffic channels supplied by a digital subscriber loop access multiplexer with selected wireline twisted pairs. While some of the wireline connection points of the (CTAS) matrix switch may be effectively unterminated, the ones of interest will be coupled by a multidistribution frame to subscriber loop 'drops', that may extend a substantial distance out to a customer premises equipment site.

Pursuant to the automated single ended noise measurement and location mechanism of the mechanism a noise measurement is conducted by the test head for each cross-connect matrix point of the matrix switch, so as to derive a noise value for each wireline. Each measured noise value is stored in association with its cross-connect point, so that it may be associated with any cable plant that extends from the access point. Unterminated cross points are those that have no wirelines at all, or have extremely short pairs, that are visibly unterminated. Since unterminated points of the matrix switch are connected to no remote location, any noise measured at these points represents noise sourced in the central office, and is considered to be the lowest amplitude noise value. These lowest noise measurements are averaged to derive a noise background value, that will be subtracted off the noise values associated with remote cable plants.

The wireline pairs that extend to various CPE sites include intermediate length sections between the matrix switch and the main distribution frame, and considerably longer sections of cable plant to the CPE sites. Due to strict engineering practices at telephone company facilities, and the fact that its components are protected and not easily accessible by field personnel, the likelihood that significant noise sources are associated with the central office is extremely low. On the other hand, as the wireline cable plants to CPE sites are mostly unshielded, untwisted cable, that is high susceptible to noise, any substantial noise may be validly assumed to be sourced at or in the vicinity of the CPE sites. The lengths of the cable plant to the CPE sites may be readily estimated using capacitance measurements conducted for each cross-connect point. In addition, the attenuation for the estimated lengths of cable plant may be determined using industry standard copper loop attenuation characteristics.

Each respective noise measurement value is compared with a prescribed threshold indicative of what is considered to be a 'failure' of the line, as may be due, for example, to excessive crosstalk from another digital communication service, or as a result of a physical impairment on the line, that requires physical intervention (e.g., removal and/or repair) by service personnel. If the noise threshold is exceeded, the line is marked for service by telco personnel, so that the problem may be resolved, and thereby improve the line's digital transport capability.

The locations of those noise values that do not exceed the failure threshold are determined using the cable plant length estimates. These estimates may be validly employed, since those portions of the wireline pairs which are most susceptible to noise are the generally unshielded, untwisted drops, that extend to the CPE sites. This implies that the actual distance of the noise source from the single ended measurement point of the test head at the interconnect matrix switch is the same as the cable plant length for the test point of interest.

The actual amplitude of the noise source whose location has been identified is estimated by subtracting the background value, from the original noise measurement to produce an 'adjusted' noise value that is attributable to only the noise source at the cable drop source, but which has been attenuated by the cable plant between the drop site and the measurement point at the matrix switch. Since the cable length and loss are known, the actual noise amplitude for a respective wireline is equal to the adjusted noise amplitude multiplied by the estimated cable length and the loss per unit length of the wireline.

DETAILED DESCRIPTION

Figure 1:
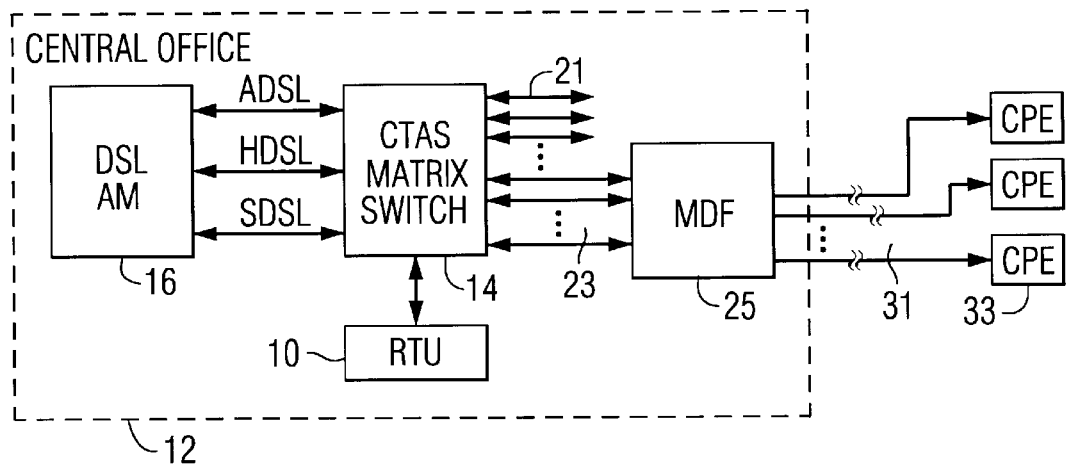
FIG. 1 is a reduced complexity network diagram showing a plurality of wireline twisted pairs that extend from a central office and customer premises installed subscriber circuits.

Before detailing the automated single ended noise measurement and location mechanism of the present invention, it should be observed that the invention resides primarily in an arrangement of conventional telecommunication hardware components and attendant supervisory communications microprocessor circuitry and application software therefor, that controls the operations of such components and analysis of signal waveforms interfaced therewith. In a practical implementation that facilitates their incorporation into telecommunication link test equipment (such as that which may be installed at a central office or resident in a craftsperson's test device), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such components and the manner in which they may be interfaced with a (copper) wireline communication link have, for the most part, been illustrated in the drawings by readily understandable block diagrams and flow charts, which show only those specific details that are pertinent to the present invention, so as not to obscure the disclosure with details which will be readily apparent to those skilled in the art having the benefit of the description herein. Thus, the block diagram and flow chart illustrations of the Figures are primarily intended to show the major components and functional modules of the system of the invention in convenient functional groupings, whereby the present invention may be more readily understood.

Attention is now directed to FIG. 1, wherein a reduced complexity embodiment of the automated single ended noise measurement and location mechanism of the present invention is diagrammatically shown as comprising a processor-controlled test head 10, such as may be installed in a central office 12, or as part of test signal generation and processing circuitry of a portable craftsperson's test set. The test head 10 may comprise any of a variety of commercially available test units employed in the industry used to conduct wideband electrical measurements on a selected line under test. As non-limiting examples, the test head 10 may comprise a Turnstone CX-100 test unit, or a Harris Wideband Test Pack.

Within the test head 10, a test control digital processor is programmed to generate digitally created test signals for application to the line under test, and to conduct a digitally-based analysis of the line's response to the test signals, in accordance with the noise measurement mechanism of the invention to be described below with reference to the flow chart of FIG. 2. As test signals generated by the test unit typically include one or more (frequency swept) analog tones, the test set's control processor is interfaced through digital-to-analog and analog-to-digital converter circuits to line-driver and input receiver amplifiers that connect to the line through fixed impedances.

For purposes of providing a practical implementation, the (single ended) access point of the test head circuitry is shown in FIG. 1 as comprising any of the cross connect points of a conventional interconnect matrix switch 14, such as the above-referenced CTAS matrix switch. The interconnect matrix switch 14 is controllably operative to connect one or more high data rate digital data traffic channels (e.g., ADSL, HDSL and SDSL channels) supplied by a digital subscriber loop access multiplexer (DSL AM) 16 with selected wireline twisted pairs. In a typical central office installation, some number of the wireline connection points of the matrix switch 14 will be effectively unterminated, as shown at 21, while others, shown at 23, will be coupled via a multidistribution frame (MDF) 25 to subscriber loop 'drops' 31, which can extend a substantial distance (e.g., thousands of feet) out to a customer premises equipment (CPE) site 33.

Figure 2:
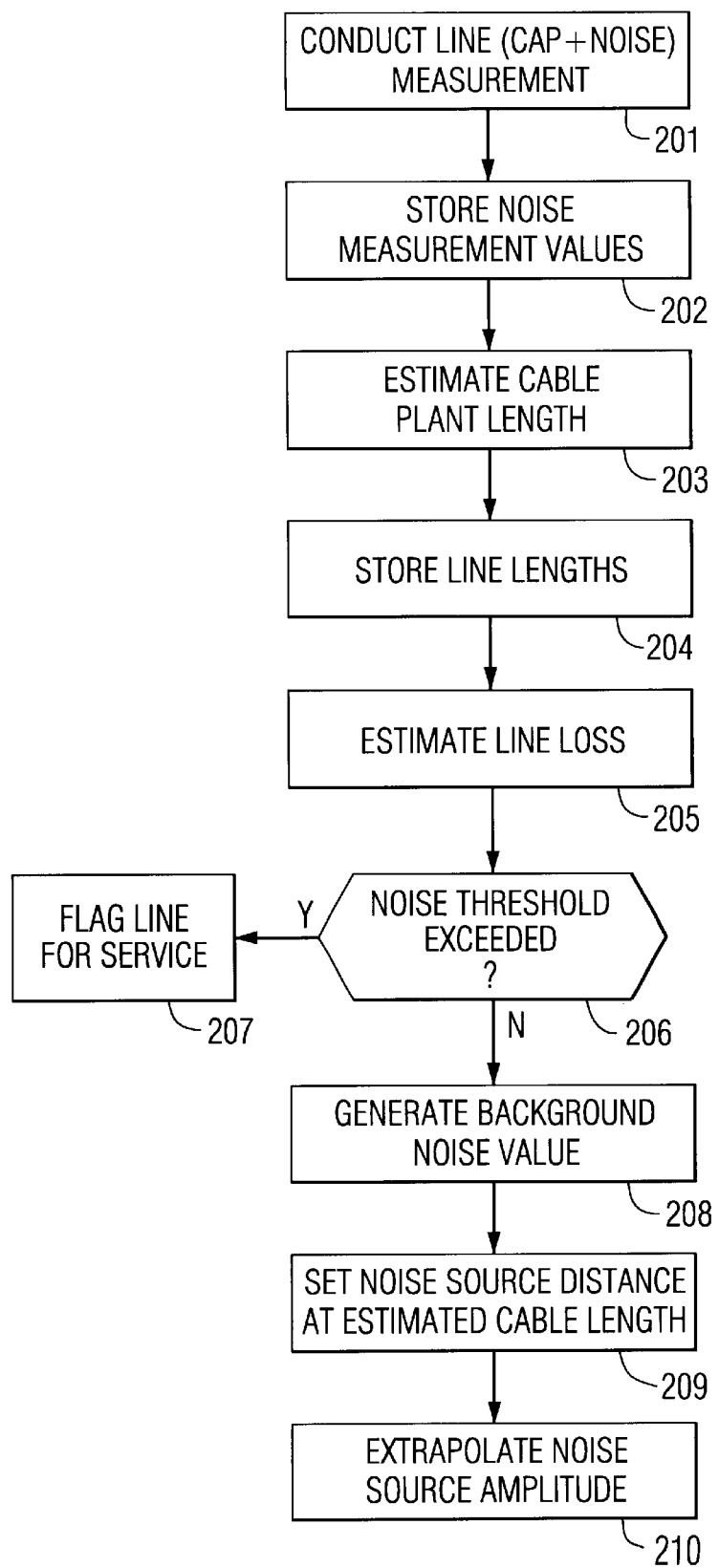
FIG. 2 is a flow chart showing the steps of the automated noise extrapolation mechanism of the present invention.

The overall functional sequence of the automated single ended noise measurement and location mechanism of the present mechanism is shown in the flow diagram of FIG. 2. At an initial step 201, a noise measurement is conducted by the test head 10 at each cross-connect matrix point of the matrix switch 14, so as to derive a noise value for each wireline connection, whether terminated or not. In step 202, each measured noise value is stored in association with its cross-connect point, so that it may be associated with a respective length of any cable plant extending from that point, as will be described.

As noted above, in a typical central office installation, some number of the wireline connection points of the matrix switch 14 will be effectively unterminated, while others will be coupled through the MDF 25 over relatively long subscriber loop drops 31, which may extend thousands of feet out to customer premises equipment. By unterminated cross points are meant those that have no wirelines at all, or have extremely short (e.g., on the order of ten feet) pairs, that are visibly unterminated. Since unterminated points of the matrix switch are, by definition, connected to no remote (e.g., CPE) location, any noise measured at these points represents whatever is produced in the central office, and may therefore be considered to be the 'best' (lowest amplitude) noise value. Preferably, as shown in step 208, described below, the noise values obtained for all unterminated cross points are averaged to derive a noise baseline representative of noise that is attributable to the central office.

The wireline pairs that extend to CPE sites also include both intermediate length sections 23 (e.g. on the order of 100–300 feet) between interconnect matrix switch 14 and MDF 25, and substantially longer pairs of cable plant 31 (e.g., on the order of up to several thousand feet or more) from the MDF 25 to the CPE site 33. Due to the engineering of telephone company facilities, there is a very low probability that improper terminations have been made within the central office 12. In addition, its components, such as the DSL AM 16, matrix switch 14 and MDF 25 are protected and not easily accessible by field personnel. Consequently, noise sources that are associated with the wireline cable plant to CPE sites, the lengths of which include both the intermediate length sections 23 and the longer sections 31, may be validly assumed to be located along the CPE drops 31, which are mostly unshielded, untwisted cable that is high susceptible to noise.

Cable plant length is estimated in step 203, using capacitance measurements conducted for each cross-connect point. In particular, the length of any cable plant associated with each matrix measurement point is estimated, for example, in feet (or meters), based upon the known capacitance per unit distance or industry standard telephone cable of 0.083 $\mu$F/mile. In step 204, the estimated values of cable plant are stored in association with their respective cross-connect points, so that an estimated value of cable plant length is store for each noise value previously measured in step 201 and stored in step 202.

Figure 3:
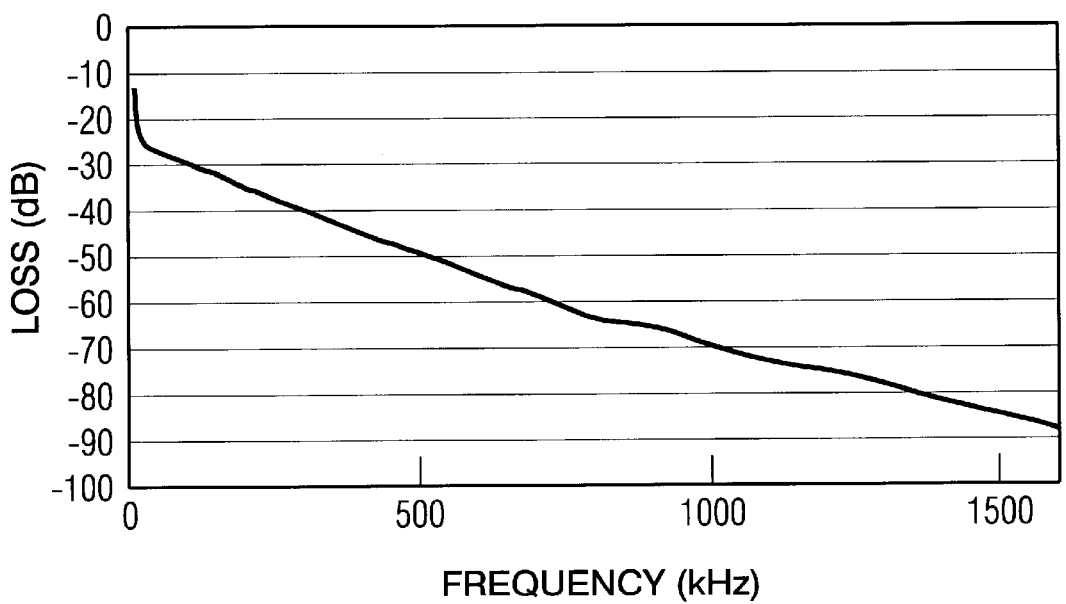
FIG. 3 is a graph depicting the variation of (copper) wireline attenuation (cable loss) with frequency.

Next, in step 205, the loss or attenuation for the lengths of cable plant estimated in step 203 and stored in step 204 is estimated. This is readily determined using industry standard copper loop attenuation characteristics, such as those illustrated in FIG. 3, which is a graph depicting the variation in loss (in dB) with frequency of No. 26 American gauge copper wire line, which is currently in use in over 80% of the United States telephone cable plants.

Next, in query step 206, each respective noise value is compared with a prescribed excessive threshold indicative of what is considered to be a 'failure' of the line, as may be due, for example, to excessive crosstalk from another (e.g., Ti) service, or as a result of a physical impairment on the line, that requires physical intervention by service personnel. If the noise threshold is exceeded (the answer to query step 206 is YES), the line is marked or flagged for service in step 207. If answer to query step 206 is NO, the routine transitions to step 208.

In step 208, the noise values obtained for all unterminated cross points that have been determined to be unterminated or associated with line lengths, that are effectively confined to the central office are averaged, so as to derive a 'background' or 'baseline' value, representative of noise that is attributable to the central office.

As described above, those portions of the wireline pairs which are most susceptible to noise are the generally unshielded, untwisted lengths of cable or 'drops' 31, that extend from the MDF 25 to various CPE sites 33. Consequently, noise introduced into these sections of wireline cable plant may be validly assumed to be located in the vicinity of or at the CPE sites. This implies that the actual distance of the noise source from the single ended measurement point (of the test head 10) at the matrix switch 14 is the same as the cable plant length for the test point of interest. In step 209, the location of a respective noise source on a wireline extending from a crosspoint of interest is identified as the cable length previously estimated in step 203.

The actual amplitude of the noise source whose location has been identified in step 209 is extrapolated in step 210. First, the background value, which is representative of the noise attributable to the central office in step 208, is subtracted from the noise measurement value derived in step 201 and stored in step 202. This produces a noise difference value that represents an 'adjusted' noise value that is attributable to only the noise source at the cable drop source, but which has been attenuated by the cable plant between the drop site and the measurement point (at the matrix switch 14). Since the cable length and loss are known from steps 203–205, the actual noise amplitude for a respective wireline is set equal to the 'adjusted' noise amplitude multiplied by the cable length (obtained from step 203 or step 209)) and the loss per unit length of the wireline (obtained from step 205).

As will be appreciated from the foregoing description, the inability of conventional single ended measurement schemes to accurately and reliably identify the location and amplitude of a noise source along a wireline telecommunication link is effectively obviated by the noise measurement mechanism of the invention, which combines the ability to make accurate electrical measurements from a single access point and inherent characteristics of the cable plant, particularly in the vicinity of the drop, to extrapolate both the distance of the noise source from the test point as well as the actual amplitude of the noise as injected or induced at the remote source.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of identifying the location and amplitude of a source of noise along a wireline telecommunication link comprising the steps of:

(a) conducting electrical measurements from a single access location in a telecommunication facility to said wireline telecommunication link, that include measuring noise on said wireline telecommunication link at each cross-connect point of a switch, and a measurement from which attenuation along and length of said wireline telecommunication link may be determined; and (b) processing measurement values obtained in step (a) to determine the location of said source of noise and the amplitude of the noise at said location of said wireline telecommunication link by storing measured noise values associated with each cross-connect point of a switch, averaging noise values for any unterminated cross points to derive a noise balance representative of noise attributable to a central office, determining wireline length and loss per unit length based on capacitance measurements, determining a noise difference value that is attributable only to a noise source at a cable drop source and determining the noise amplitude and its location from the wire length, loss per unit length and noise difference values.

2. A method according to claim 1, wherein step (b) comprises processing measurement values obtained in step (a) to determine attenuation along and length of said wireless telecommunication link, and modifying the value of noise measured at said single access location in step (a) by an amount based upon the determined attentuation along and length of said wireless telecommunication link to realize said amplitude of the noise at said location of said wireline telecommunication link.

3. A method according to claim 2, wherein step (a) further comprises conducting a noise measurement from said single access location in said telecommunication facility for at least one other wireline telecommunications link, so as to derive a noise background value representative of noise that is attributable to said telecommunication facility, and wherein step (b) further comprises adjusting the value of noise measured at said single access location in step (a), in accordance with said noise background value to produce an adjusted noise value, and modifying said adjusted noise value by an amount based upon the determined attenuation along and length of said wireline telecommunication link to realize said amplitude of the noise at said location of said wireline telecommunication link.

4. A method according to claim 1, wherein step (b) comprises extrapolating said adjusted noise value in accordance with the determined attenuation along and length of said wireline telecommunication link to produce the amplitude of the noise at said location of said wireline telecommunication link.

5. A method according to claim 4, wherein said measurement from which attenuation along said wireline telecommunication link may be determined includes a capacitance measurement, and wherein step (b) comprises determining the length of said wireline telecommunication link in accordance with capacitance measurement information, and determining attenuation along said length of said wireline telecommunication link in accordance with prescribed industry standard attenuation loss characteristics.

6. A method of identifying the locations and amplitudes of sources of noise along a plurality of wireline telecommunication links comprising the steps of:
 (a) conducting electrical measurements from a single access location in a telecommunication facility to each of said wireline telecommunication links, that include measuring noise on each of said wireline telecommunication links, and a measurement from which attenuation along and lengths of said wireline telecommunication links may be determined; and
 (b) processing measurement values obtained in step (a) to determine the locations of said sources of noise and the amplitudes of the noise at said locations of said wireline telecommunication links by storing measured noise values associated with each cross-connect point of a switch, averaging noise values for any unterminated cross points to derive a noise balance representative of noise attributable to a central office, determining wireless length and loss per unit length based on capacitance measurements, determining a noise difference value that is attributable only to a noise source at a cable drop source and determining the noise amplitude and its location from the wire length, loss per unit length and noise difference values.

7. A method according to claim 6, wherein step (b) comprises processing measurement values obtained in step (a) to determine attenuation along and lengths of said wireline telecommunication links, and modifying the values of noise measured at said single access location in step (a) based upon the determined attenuation along and lengths of said wireline telecommunication link to extrapolate amplitudes of the noise at said locations of said wireline telecommunication links.

8. A method according to claim 7, wherein step (b) further comprises deriving, from noise measurements conducted in step (a), a noise background value representative of noise attributable to said telecommunication facility, and adjusting the values of noise measured in step (a), in accordance with said noise background value to produce adjusted noise values, and modifying said adjusted noises value in accordance with the determined attenuation along and lengths of said wireline telecommunication links to obtain values of noise amplitude at said locations of said wireline telecommunication links.

9. A method according to claim 8, wherein said measurement from which attenuation along said wireline telecommunication links may be determined includes a capacitance measurement, and wherein step (b) comprises determining lengths of said wireline telecommunication links in accordance with capacitance measurement information, and determining attenuation along said lengths of said wireline telecommunication links in accordance with prescribed industry standard attenuation loss characteristics.

10. A method according to claim 6, wherein step (a) further includes identifying one or more wireline telecommunication links whose measured noise values are excessive.

11. A method according to claim 10, further including the step of (c) modifying a characteristic of said one or more wireline telecommunication links whose measured noise values are excessive, so as to improve the digital communication transport capability of said one or more wireline telecommunication links.

12. A system for identifying the locations and amplitudes of sources of noise along a plurality of wireline telecommunication links, said system comprising a test unit that is operative to couple one or more test stimuli to a single measurement location of said wireline telecommunications links in a telecommunication facility, so as to measure noise on said wireline telecommunication links, and derive data from which attenuation along and lengths of said wireline telecommunication links may be determined, and a measurement processor which is operative to process measurement values and data obtained by said test unit, so as to generate outputs representative of the locations of said sources of noise and the amplitudes of the noise at said locations of said wireline telecommunication links, wherein said measurement processor is operative to process measurement data to determine attenuation along and lengths of said wireline telecommunication links, and to modify values of noise measurements in accordance with determined attenuation along and lengths of said wireline telecommunication link, so as to extrapolate amplitudes of noise at said locations of said wireline telecommunication links, wherein said measurement processor is operative for storing measured noise values associated with each cross-connect point of a switch, averaging noise values for any unterminated cross points to derive a noise balance representative of noise attributable to a central office, determining wireline length and loss per unit length based on capacitance measurements, determining a noise difference value that is attributable only to a noise source at a cable drop source and determining the noise amplitude and its location from the wire length, loss per unit length and noise difference values.

13. A system according to claim 1 wherein said measurement processor is operative to derive a noise background value representative of noise attributable to said telecommunication facility, and to adjust values of noise measurements in accordance with said noise background value, so as to produce adjusted noise values, and to modify said adjusted noises value in accordance with the determined attenuation along and lengths of said wireline telecommunication links to obtain values of noise amplitude at said locations of said wireline telecommunication links.

14. A system according to claim 13, wherein said measurement from which attenuation along said wireline telecommunication links may be determined includes a capacitance measurement, and wherein said measurement processor is operative to determine lengths of said wireline telecommunication links in accordance with capacitance measurement information, and to determine attenuation along said lengths of said wireline telecommunication links in accordance with prescribed industry standard attenuation loss characteristics.

15. A method according to claim 12, wherein said measurement processor is operative to identify one or more wireline telecommunication links whose measured noise values are excessive.

* * * * *

UNITED STATES PATENT AND TRADEMARK OFFICE
CERTIFICATE OF CORRECTION

PATENT NO. : 6,341,159 B1  Page 1 of 1
DATED : January 22, 2002
INVENTOR(S) : James M. Jollota It is certified that error appears in the above-identified patent and that said Letters Patent is hereby corrected as shown below:

<u>Title page, Item [54] and Column 1, line 1,</u>
Delete: "EXTRAPOLATION OF LOCATION AND AMPLITURE OF NOISE SOURCES ON TELECOMMUNICATION WIRELINE FROM ENDED ACCESS POINT" insert -- EXTRAPOLATION OF LOCATION AND AMPLITURE OF NOISE SOURCES ON TELECOMMUNICATION WIRELINE FROM SINGLE ENDED ACCESS POINT --

<u>Column 2,</u>
Line 52, delete "high" insert -- highly --

<u>Column 5,</u>
Line 19, delete "high" insert -- highly --
Line 45, delete "Ti" insert -- T1 --

<u>Column 7,</u>
Line 5, delete "wireless" insert -- wireline --

<u>Column 8,</u>
Line 66, delete "1" insert -- 12 --

<u>Column 10,</u>
Line 7, delete "method" insert -- system --

Signed and Sealed this

Thirtieth Day of July, 2002

Attest:

Attesting Officer

JAMES E. ROGAN
*Director of the United States Patent and Trademark Office*